(12) United States Patent
Oyama et al.

(10) Patent No.: US 11,063,267 B2
(45) Date of Patent: Jul. 13, 2021

(54) FUEL CELL SEPARATOR AND FUEL CELL STACK (71) Applicant: HONDA MOTOR CO., LTD., Tokyo (JP)

(72) Inventors: Satoshi Oyama, Wako (JP); Yu Tomana, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 16/507,109

(22) Filed: Jul. 10, 2019

(65) Prior Publication Data
US 2020/0020958 A1 Jan. 16, 2020

(30) Foreign Application Priority Data
Jul. 13, 2018 (JP) .............................. JP2018-133002

(51) Int. Cl.
H01M 8/00 (2016.01)
H01M 8/0247 (2016.01)
H01M 8/0276 (2016.01)
H01M 8/241 (2016.01)
H01M 8/0267 (2016.01)
H01M 8/1004 (2016.01)

(52) U.S. Cl.
CPC ....... *H01M 8/0247* (2013.01); *H01M 8/0267* (2013.01); *H01M 8/0276* (2013.01); *H01M 8/1004* (2013.01); *H01M 8/241* (2013.01)

(58) Field of Classification Search
CPC .. H01M 8/1004; H01M 8/241; H01M 8/0276; H01M 8/0273; H01M 8/0247; Y02E 60/50
See application file for complete search history.

(56) References Cited

U.S. PATENT DOCUMENTS

| 6,605,380 B2 | 8/2003 | Chen et al. | |
| 6,861,171 B1* | 3/2005 | Suzuki | H01M 8/242 429/510 |
| 2005/0214620 A1* | 9/2005 | Cho | H01M 8/0284 429/483 |

* cited by examiner

Primary Examiner — Cynthia H Kelly
Assistant Examiner — Monique M Wills
(74) Attorney, Agent, or Firm — Amin, Turocy & Watson, LLP (57) ABSTRACT A fuel cell separator (first and second separators) of a fuel cell stack is formed in a plate shape, and includes a passage bead (projection) configured to form a seal that prevents leakage of fluid. The passage bead is formed integrally with a surface of the separator in a manner so as to project from the surface, and when viewed in cross section, is formed in a multistage trapezoidal shape.

8 Claims, 6 Drawing Sheets

FUEL CELL SEPARATOR AND FUEL CELL STACK

CROSS-REFERENCE TO RELATED APPLICATION

This application is based upon and claims the benefit of priority from Japanese Patent Application No. 2018-133002 filed on Jul. 13, 2018, the contents of which are incorporated herein by reference.

BACKGROUND OF THE INVENTION

Field of the Invention

The present invention relates to a fuel cell separator and a fuel cell stack.

Description of the Related Art

A fuel cell stack is constituted by stacking together a plurality of power generation cells. Each of the power generation cells is equipped with a membrane electrode assembly (MEA) in which an anode, a solid polymer electrolyte membrane, and a cathode are stacked, and a pair of fuel cell separators in the form of bipolar plates that sandwich the MEA therebetween.

For example, in U.S. Pat. No. 6,605,380, a pair of plates (fuel cell separators) are disclosed which are applied to a power generation cell. A bead which projects from a separator surface is formed on one of the fuel cell separators. Such a bead, for example, surrounds an outer peripheral side of a flow field over which a reactant gas flows, and by forming a seal between the one fuel cell separator and another fuel cell separator, leakage of the reactant gas (fluid) is prevented.

SUMMARY OF THE INVENTION

Incidentally, in the fuel cell separator, the plate itself is formed with both concave and convex shapes, and the convex shape can form a bead. In such a case where the bead is formed on the plate in the above manner, when the protruding end side of the bead receives a compressive load in a sealed state, the bead disperses the compressive load, by a root portion thereof that is contiguous with the plate being elastically expanded in a widthwise direction. However, in a case that the root portion of the bead is hard (a strong restraining force is acting thereon) due to the shape of the location where the bead is provided or the like, the root portion does not undergo elastic expansion, and therefore, there is a possibility that the portion where sealing is being performed by the protruding end portion (the tip end part) of the bead may undergo center-folding (buckling).

The present invention has been devised while taking into consideration the aforementioned circumstances, and has the object of providing a fuel cell separator and a fuel cell stack having a bead which is capable of forming a suitable seal with a simple configuration.

In order to realize the aforementioned object, one aspect of the present invention is characterized by a fuel cell separator formed in a plate shape and including a bead configured to form a seal for preventing leakage of fluid, wherein the bead is formed integrally with the fuel cell separator, and when viewed in cross section, protrudes from a plate surface of the fuel cell separator together with being formed in a multistage trapezoidal shape.

Further, in order to realize the aforementioned object, a fuel cell stack according to another aspect of the present invention includes the above-described fuel cell separators and a plurality of membrane electrode assemblies, wherein joint separators and the plurality of membrane electrode assemblies are alternately stacked on one another, each of the joint separators comprising the fuel cell separators.

According to the present invention, in the fuel cell separator and the fuel cell stack, by means of a simple structure in which the beads are formed integrally with the plate surfaces of the separators in a manner so as to project from the plate surfaces, and when viewed in cross section, are formed in a multistage trapezoidal shape, it is possible for seals to be suitably formed that prevent the leakage of fluid. More specifically, when the bead receives a compressive load in a stacked state of the fuel cell separator, the stepped portion of the multistage trapezoidal shape undergoes deformation (bending) more positively than the portion of the bead that is in contact with the object to be sealed. Therefore, even in the case that a strong restraining force acts on the root portion which is in close proximity to the plate surface, the bead can suppress buckling of the contacting portion and thereby achieve a suitable sealing performance. Consequently, the bead can more reliably prevent leakage of fluid from the sealed portion with the object, and the fluid can be made to flow in a stable manner.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of the present invention will be presented and described in detail below with reference to the accompanying drawings.

Figure 1:
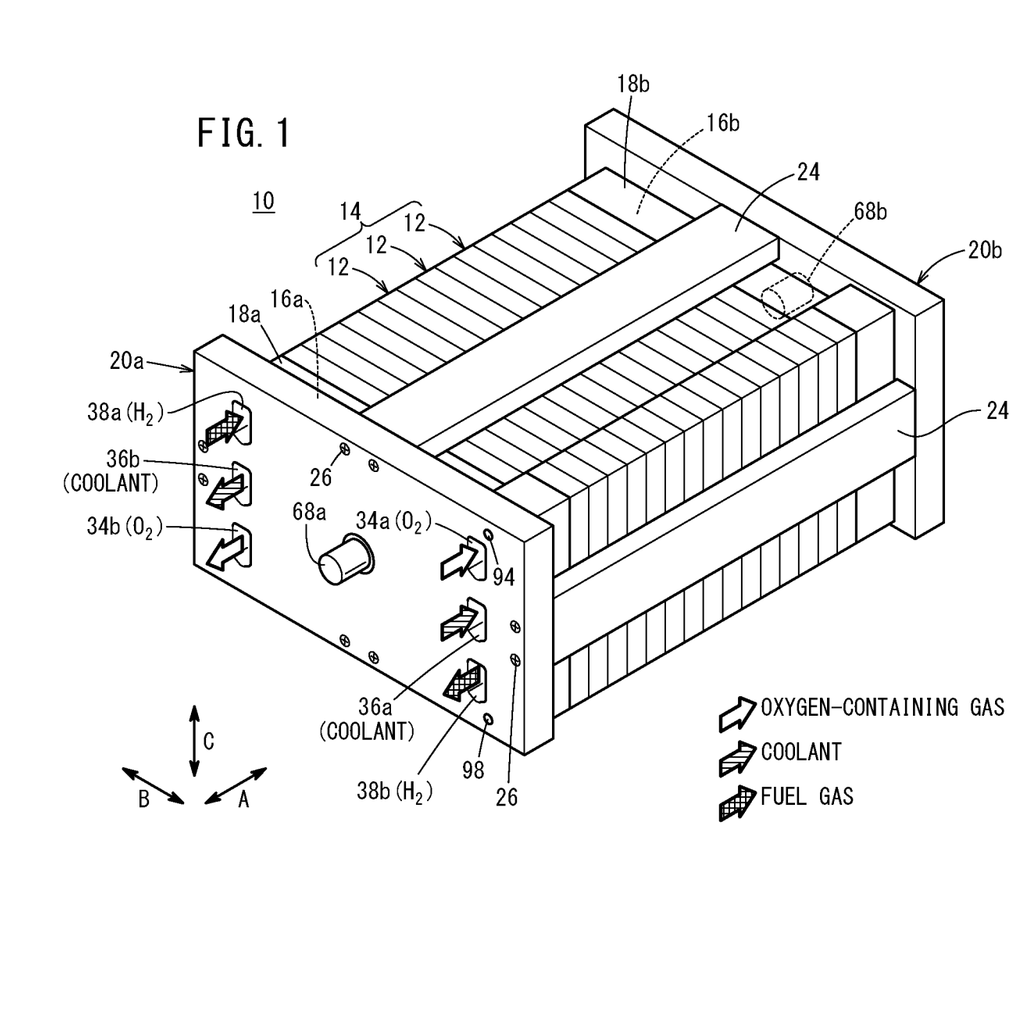
FIG. 1 is a perspective view showing an overall configuration of a fuel cell stack to which there is applied a fuel cell separator according to an embodiment of the present invention.

As shown in FIG. 1, a fuel cell stack 10 according to an embodiment of the present invention is equipped with a stack body 14 in which a plurality of power generation cells 12 each constituting a unit fuel cell are stacked in a horizontal direction (the direction of the arrow A or in a direction of gravity (the direction of the arrow C). The fuel cell stack 10, for example, is mounted in a non-illustrated fuel cell vehicle (fuel cell automotive vehicle).

A terminal plate 16a, an insulator 18a, and an end plate 20a are arranged in this order sequentially toward the outside on one end of the stack body 14 in the stacking direction (the direction of the arrow A). A terminal plate 16b, an insulator 18b, and an end plate 20b are arranged in this order sequentially toward the outside on another end of the stack body 14 in the stacking direction.

The terminal plates 16a and 16b are plate members made of metal for extracting electrical power from the power generation cells 12, and include terminals 68a and 68b that extend outwardly in the stacking direction in central portions thereof. The insulators 18a and 18b are formed by an insulating material, for example, polycarbonate (PC), phenol resin, or the like.

The end plates 20a, 20b have horizontally elongate rectangular shapes (they may also have vertically elongate shapes), together with coupling bars 24 being arranged respectively between opposing sides thereof. The coupling bars 24 are fixed to inner surfaces of the end plates 20a, 20b, so as to apply a tightening load to the plurality of stacked power generation cells 12 in the stacking direction (the direction of the arrow A). The fuel cell stack 10 may be equipped with a casing in which the end plates 20a and 20b are provided as end plates thereof, and a structure may be provided in which the stack body 14 is accommodated inside such a casing.

Figure 2:
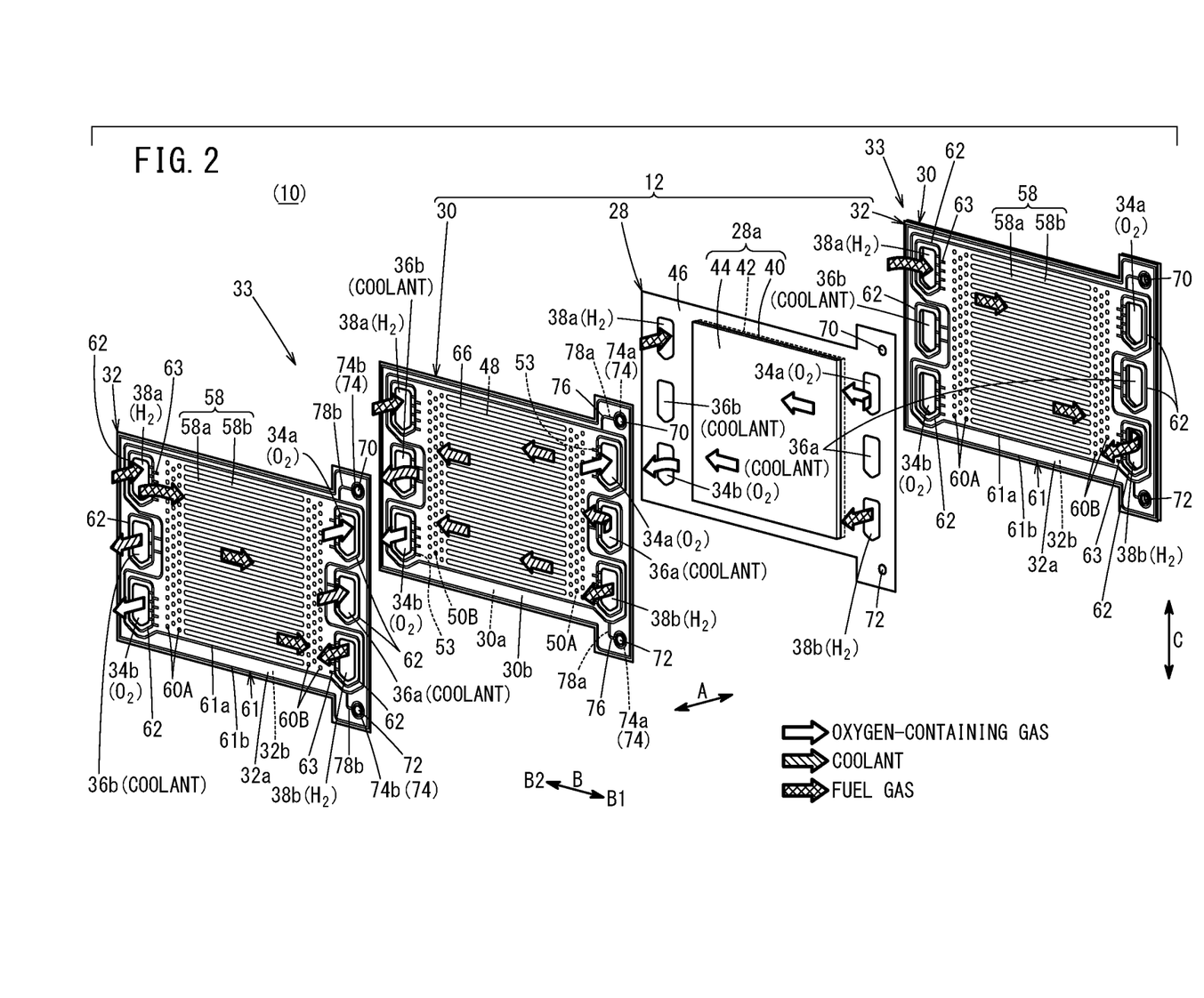
FIG. 2 is an exploded perspective view showing a power generation cell of the fuel cell stack.

As shown in FIG. 2, each of the power generation cells 12 includes a resin frame equipped MEA 28, a first metal separator 30 (hereinafter, simply referred to as a first separator 30) disposed on one surface of the resin frame equipped MEA 28, and a second metal separator 32 (hereinafter, simply referred to as a second separator 32) disposed on another surface of the resin frame equipped MEA 28. The first and second separators 30 and 32 are formed in plate shapes, and correspond to the fuel cell separator of the present invention.

Each of the first and second separators 30 and 32 is formed by press forming of a metal thin plate to have a corrugated shape in cross section. For example, the metal plate is a steel plate, a stainless steel plate, an aluminum plate, a plated steel sheet, or a metal plate having an anti-corrosive surfaces produced by performing a surface treatment thereon. The first and second separators 30 and 32 are joined together by welding, brazing, or crimping the outer peripheries thereof to thereby constitute an integrally joint separator 33.

At one end edge portion of the power generation cell 12 in the horizontal direction which is the longitudinal direction of the power generation cell 12 (one end edge portion in the direction of the arrow B1), an oxygen-containing gas supply passage 34a, a coolant supply passage 36a, and a fuel gas discharge passage 38b are provided which extend through the power generation cell 12 in the stacking direction (the direction of the arrow A). The oxygen-containing gas supply passage 34a, the coolant supply passage 36a, and the fuel gas discharge passage 38b are arranged in a vertical direction (in the direction of the arrow C). An oxygen-containing gas is supplied through the oxygen-containing gas supply passage 34a. The coolant supply passage 36a serves to supply a coolant, for example, water. A fuel gas, for example, a hydrogen-containing gas, is discharged through the fuel gas discharge passage 38b.

At another end edge portion of the power generation cell 12 in the longitudinal direction (another end edge portion in the direction of the arrow B2), a fuel gas supply passage 38a, a coolant discharge passage 36b, and an oxygen-containing gas discharge passage 34b are provided which extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant discharge passage 36b discharges the coolant. The oxygen-containing gas is discharged through the oxygen-containing gas discharge passage 34b. Moreover, the arrangement of the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b is not limited to that shown for the present embodiment, and may be set appropriately depending on required specifications.

The resin frame equipped MEA 28 comprises a membrane electrode assembly 28a (hereinafter referred to as an "MEA 28a"), and a resin frame member 46 provided on an outer peripheral portion of the MEA 28a. As the resin frame member 46, a frame-shaped film member may be used. The MEA 28a includes an electrolyte membrane 40, an anode 42 provided on one surface of the electrolyte membrane 40, and a cathode 44 provided on another surface of the electrolyte membrane 40. Moreover, concerning the MEA 28a, the electrolyte membrane 40 may be formed to project outwardly without using the resin frame member 46. Further, a frame-shaped resin film may be disposed on both sides of the outwardly projecting electrolyte membrane 40.

The electrolyte membrane 40, for example, is a solid polymer electrolyte membrane (cation ion exchange membrane), which is formed by impregnating a thin membrane of perfluorosulfonic acid with water. A fluorine based electrolyte may be used as the electrolyte membrane 40. Alternatively, an HC (hydrocarbon) based electrolyte may be used as the electrolyte membrane 40.

An inner peripheral edge surface of the resin frame member 46 is in close proximity to or overlaps or abuts against an outer peripheral edge surface of the electrolyte membrane 40. At an end edge portion of the resin frame member 46 on a side in the direction of the arrow B1, the oxygen-containing gas supply passage 34a, the coolant supply passage 36a, and the fuel gas discharge passage 38b are provided. At an end edge portion of the resin frame member 46 in the direction of the arrow B2, the fuel gas supply passage 38a, the coolant discharge passage 36b, and the oxygen-containing gas discharge passage 34b are provided.

For example, the resin frame member 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), silicone resin, fluororesin, m-PPE (modified polyphenylene ether) resin, PET (polyethylene terephthalate), PBT (polybutylene terephthalate), or modified polyolefin.

Figure 3:
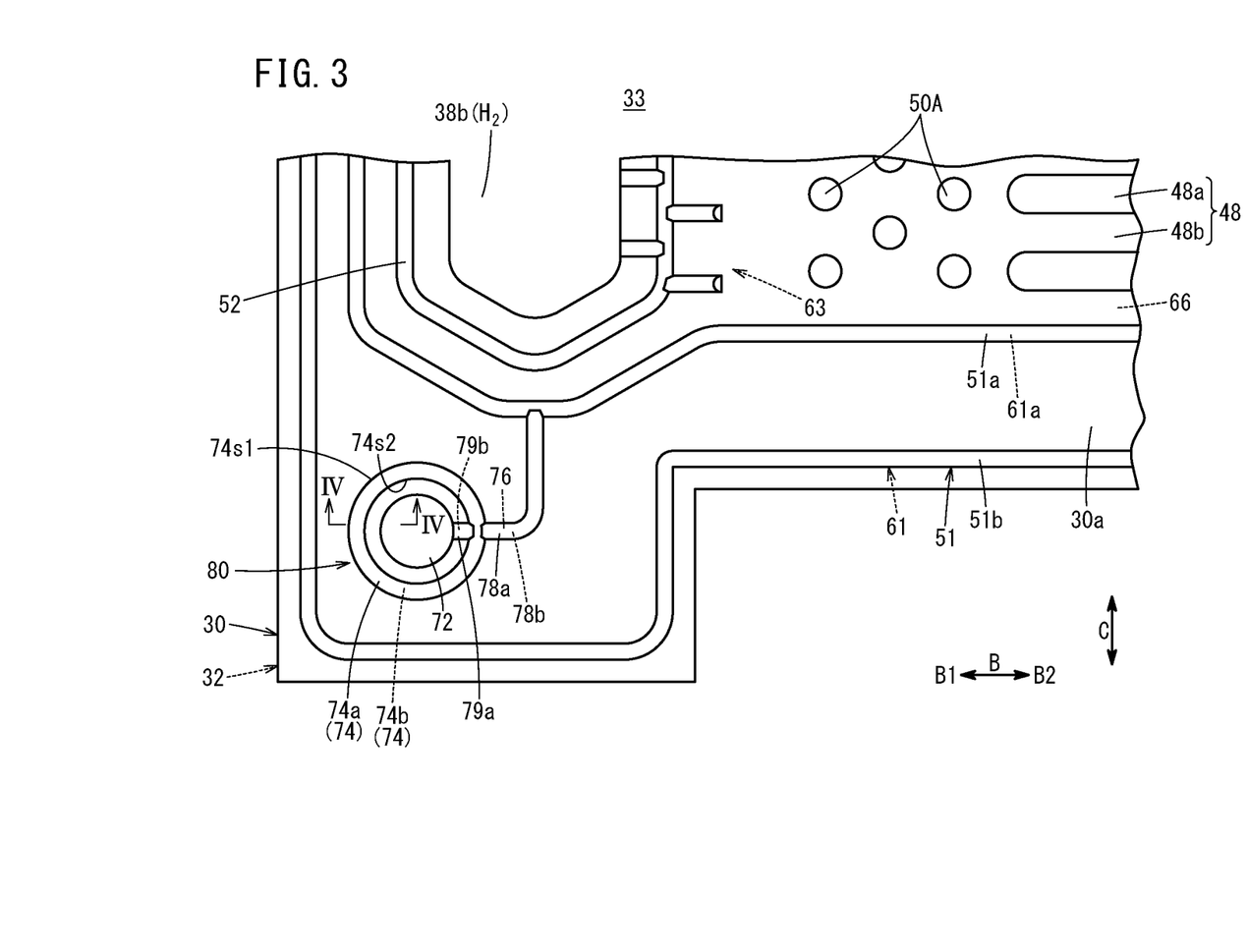
FIG. 3 is a partial plan view showing a configuration in the vicinity of a coolant drain passage of a joint separator.

As shown in FIG. 3, the first separator 30 comprises an oxygen-containing gas flow field 48 that allows an oxygen-containing gas to flow, on a surface 30a of the resin frame equipped MEA 28 facing toward the cathode 44 (in FIG. 2, for the sake of convenience, the flow direction of the oxygen-containing gas is shown on the cathode 44 of the MEA 28a). The oxygen-containing gas flow field 48 is constituted by straight flow grooves 48b (or alternatively, wavy flow grooves) formed between a plurality of protrusions 48a that extend in the direction of the arrow B (horizontal direction) of the first separator 30.

The oxygen-containing gas flow field 48 communicates fluidically with the oxygen-containing gas supply passage 34a and the oxygen-containing gas discharge passage 34b. On the surface 30a of the first separator 30, an inlet buffer 50A having a plurality of embossed portions is disposed between the oxygen-containing gas supply passage 34a and the oxygen-containing gas flow field 48. Further, on the surface 30a of the first separator 30, an outlet buffer 50B having a plurality of embossed portions is disposed between the oxygen-containing gas discharge passage 34b and the oxygen-containing gas flow field 48.

As shown in FIG. 3, on the surface 30a of the first separator 30, first seal lines 51 (beads for sealing) which bulge out toward the resin frame equipped MEA 28 are formed by press forming. The first seal lines 51 include an inner bead 51a surrounding the oxygen-containing gas flow field 48, the inlet buffer 50A, and the outlet buffer 50B, and an outer bead 51b that extends along the outer periphery of the first separator 30 on an outer side from the inner bead 51a.

Further, the first seal lines 51 include a plurality of passage beads 52 that respectively surround the peripheries of the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. A plurality of bridge sections 53 are provided on inner sides and outer sides of the passage beads 52 that communicate with the oxygen-containing gas supply passage 34a and the oxygen-containing gas discharge passage 34b. The bridge sections 53 are formed by press forming so as to protrude toward the resin frame equipped MEA 28. The bridge sections 53 include tunnels (not shown), which communicate with the oxygen-containing gas supply passage 34a and the oxygen-containing gas flow field 48, and supply the oxygen-containing gas that is introduced from the oxygen-containing gas supply passage 34a into the oxygen-containing gas flow field 48, and tunnels (not shown), which communicate with the oxygen-containing gas flow field 48 and the oxygen-containing gas discharge passage 34b, and allow the oxygen-containing gas that is discharged from the oxygen-containing gas flow field 48 to flow out into the oxygen-containing gas discharge passage 34b. The inner bead 51a, the outer bead 51b, and the passage beads 52 protrude from the plate surface (the surface 30a) of the first separator 30, and are formed in a one-stage trapezoidal shape as viewed in cross section (as viewed in cross section along the thickness direction of the first separator 30).

Returning to FIG. 2, the second separator 32 is equipped with a fuel gas flow field 58 that allows the fuel gas to flow, on the surface 32a facing toward the anode 42 of the resin frame equipped MEA 28. The fuel gas flow field 58 is constituted by straight flow grooves 58b (or alternatively, wavy flow grooves) formed between a plurality of protrusions 58a that extend in the direction of the arrow B (horizontal direction) of the second separator 32. The fuel gas flow field 58 communicates fluidically with the fuel gas supply passage 38a and the fuel gas discharge passage 38b.

On the surface 32a of the second separator 32, an inlet buffer 60A having a plurality of embossed portions is disposed between the fuel gas supply passage 38a and the fuel gas flow field 58. Further, on the surface 32a of the second separator 32, an outlet buffer 60B having a plurality of embossed portions is disposed between the fuel gas discharge passage 38b and the fuel gas flow field 58.

On the surface 32a of the second separator 32, second seal lines 61 (beads for sealing) which bulge out toward the resin frame equipped MEA 28 are formed by press forming. The second seal lines 61 include an inner bead 61a surrounding the fuel gas flow field 58, the inlet buffer 60A, and the outlet buffer 60B, and an outer bead 61b that extends along the outer periphery of the second separator 32 on an outer side from the inner bead 61a.

Further, the second seal lines 61 include a plurality of passage beads 62 that respectively surround the peripheries of the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. Bridge sections 63 that communicate respectively with the fuel gas supply passage 38a and the fuel gas discharge passage 38b are provided on inner sides and outer sides of the passage beads 62 that communicate with the fuel gas supply passage 38a and the fuel gas discharge passage 38b. The bridge sections 63 are formed by press forming so as to protrude toward the resin frame equipped MEA 28. The bridge sections 63 include tunnels (not shown), which communicate with the fuel gas supply passage 38a and the fuel gas flow field 58, and supply the fuel gas that is introduced from the fuel gas supply passage 38a into the fuel gas flow field 58, and tunnels (not shown), which communicate with the fuel gas flow field 58 and the fuel gas discharge passage 38b, and allow the fuel gas that is discharged from the fuel gas flow field 58 to flow out into the fuel gas discharge passage 38b. The inner bead 61a, the outer bead 61b, and the passage beads 62 protrude from the plate surface (the surface 32a) of the second separator 32, and are formed in a one-stage trapezoidal shape as viewed in cross section.

A coolant flow field 66 that communicates fluidically with the coolant supply passage 36a and the coolant discharge passage 36b is formed between a surface 30b of the first separator 30 and a surface 32b of the second separator 32 which are mutually joined to each other. The coolant flow field 66 is formed by stacking together the other surface (i.e., the back surface shape) of the first separator 30 on which the oxygen-containing gas flow field 48 is formed, and the other surface (i.e., the back surface shape) of the second separator 32 on which the fuel gas flow field 58 is formed.

In the first separator 30, the second separator 32, and the resin frame equipped MEA 28 (resin frame member 46), an air vent passage (air vent hole) 70 and a coolant drain passage (drain hole) 72, which are substantially circular as viewed in plan, are formed to penetrate in the stacking direction. The air vent passage 70 is a hole through which air existing within the coolant is evacuated, and is provided in an upper corner of the power generation cell 12 in the direction of the arrow B1 (upwardly of an uppermost part of the inner beads 51a and 61a), and includes an opening area that is smaller than that of the reactant gas passages and the coolant passages. The coolant drain passage 72 is provided in a lower corner (downwardly of a lowermost part of the inner beads 51a and 61a) at one end side of the power generation cell 12 in a horizontal direction (an end in the direction of the arrow B1), and includes an opening area that is smaller than that of the reactant gas passages and the coolant passages. The installation positions and the shapes of the air vent passage 70 and the coolant drain passage 72 are not particularly limited. Further, the resin frame equipped MEA 28 and the first and second separators 30 and 32 may be provided with other drains (such as a cathode drain hole through which water or the like that has leaked out from the oxygen-containing gas flow path is allowed to flow, and an anode drain hole through which water or the like that has leaked out from the fuel gas flow path is allowed to flow).

In addition, passage beads 74 surrounding respectively the air vent passage 70 and the coolant drain passage 72 are press formed (formed integrally) on the surfaces 30a and 32a of the first and second separators 30 and 32 facing toward the resin frame equipped MEA 28. Hereinafter, the passage beads 74 provided in the first separator 30 may also be referred to as passage beads 74a, and the passage beads 74 provided in the second separator 32 may also be referred to as passage beads 74b.

The passage beads 74 protrude from the plate surfaces (surfaces 30a and 32a) of the first and second separators 30 and 32, and are formed with circular shapes as viewed in plan. The passage beads 74 surround respectively the air vent passage 70 and the coolant drain passage 72, but otherwise, are basically designed with the same configuration. Hereinafter, with reference to FIG. 3, a description will be given representatively of the coolant drain passage 72 provided in the first separator 30, and the passage beads 74 surrounding the periphery thereof.

The coolant drain passage 72 is in communication with the coolant flow field 66 via a connecting flow channel 76. The connecting flow channel 76 is a space formed by mutually superimposing the concave portions that make up the rear sides of the bulging shapes of the first and second seal lines 51 and 61, and enables communication between the coolant drain passage 72 and the internal space (concave portions on the rear side) of the inner beads 51a and 61a.

More specifically, the first and second seal lines 51 and 61 include connecting beads 78a and 78b including the connecting flow channels 76 therein. Only one of the connecting beads 78a and 78b may be provided. Each of the connecting beads 78a and 78b is formed in a one-stage trapezoidal shape as viewed in cross section, one end thereof is connected to a lowermost part of the inner beads 51a and 61a, and another end thereof is connected to the outer peripheral side wall 74s1 of the passage beads 74.

Further, tunnels 79a and 79b, which extend from an inner peripheral side wall 74s2 of the passage beads 74 toward the coolant drain passage 72, are provided respectively in the first and second separators 30 and 32. More specifically, the coolant flow field 66 and the coolant drain passage 72 communicate with each other via the internal space of the inner beads 51a and 61a, the internal space of the connecting beads 78a and 78b, the internal space of the passage beads 74a and 74b, and the internal space of the tunnels 79a and 79b.

Figure 4A:
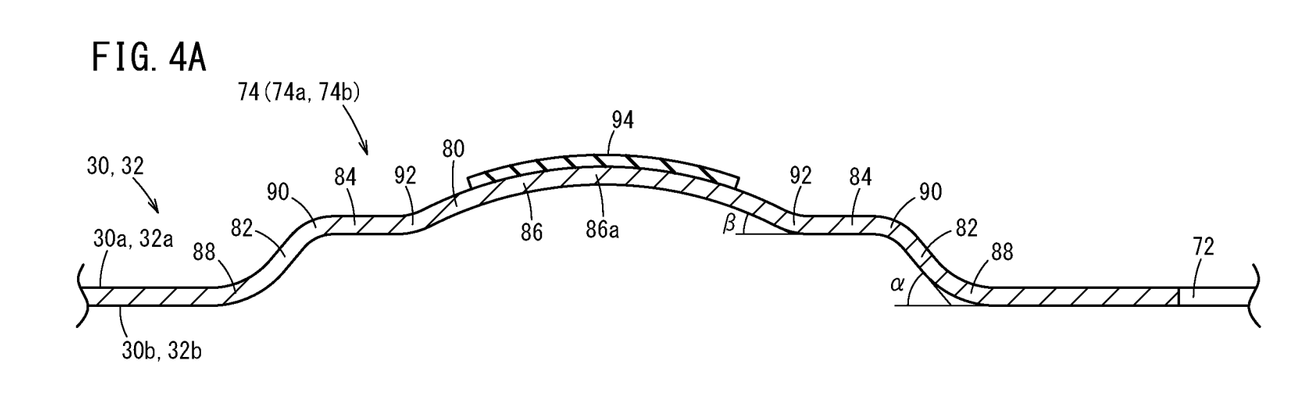
FIG. 4A is a cross-sectional view taken along line IV-IV of a first separator shown in FIG. 3.

In addition, the passage beads 74 exhibit circular shapes as viewed in plan, and further, as shown in cross section in FIG. 4A, are formed with multistage trapezoidal shaped projections 80 that project from the plate surfaces (surfaces 30a and 32a) of the first and second separators 30 and 32. For example, the projecting height of the projection 80 is set within a range of 35% to 10% with respect to the width of the projection 80. Moreover, the planar shape of the passage beads 74 is not limited to being a circular annular shape.

More specifically, in a non-stacked state of the power generation cells 12, the projection 80 includes a pair of root-side inclined portions 82 contiguous with the plate surface, a pair of stepped portions 84 contiguous with respective upper ends of the root-side inclined portions 82 and lying substantially in parallel with the plate surface, and a protruding end portion 86 contiguous with the inner sides of the stepped portions 84 and which protrudes in a direction away from the plate surface. Stated otherwise, taking the plate surface as a reference, the projection 80 has a two-stage trapezoidal shape in which the pair of stepped portions 84 forms a first stage protuberance, and the protruding end portion 86 forms a second stage protuberance.

The pair of root-side inclined portions 82 are inclined respectively at a first angle of inclination $\alpha$ with respect to the plate surface, and support the pair of stepped portions 84 at a predetermined height. In greater detail, the ratio of the heights of the pair of stepped portions 84 to the entire projecting height of the projection 80 that projects from the plate surface in the non-stacked state of the power generation cells 12 is set to lie within a range of 20% to 85%. Further, the root-side inclined portions 82 are smoothly connected to the plate surface via rounded plate-side connecting portions 88 having a first curvature.

The pair of stepped portions 84 extend substantially in parallel with the plate surface in the manner described above, and have a width that is shorter than the width of the protruding end portion 86. Further, the stepped portions 84 are smoothly connected to the root-side inclined portions 82 through rounded root-side connecting portions 90 having a second curvature. The second curvature is set to be greater than the first curvature. The pair of stepped portions 84 are designed to have the same width. Further, the root-side connecting portions 90 may be formed to be thinner than other portions of the projection 80.

The protruding end portion 86 is formed with an arcuate shape as viewed in cross section, and bridges between the ends of the pair of stepped portions 84. A central portion 86a of the protruding end portion 86 in the widthwise direction is located at the highest position on the projection 80 in the non-stacked state of the power generation cells 12. Outer sides of the protruding end portion 86 in the widthwise direction are inclined at a second angle of inclination $\beta$ with respect to the stepped portions 84. The second angle of inclination $\beta$ is set to be less than the first angle of inclination $\alpha$ ($\alpha > \beta$). Further, the protruding end portion 86 is smoothly connected to the stepped portions 84 via rounded protruding-end-side connecting portions 92 having a third curvature. The third curvature is set to be less than the second curvature.

A resin material 94 such as polyester fiber or the like is fixed by printing or coating or the like to a surface of the protruding end portion 86 in a protruding direction thereof. The resin material 94 is provided on the protruding end portion 86 over a range (on the order of 50% to 90%) that does not include the projecting-end-side connecting portions 92, and is curved and extends along the widthwise direction of the protruding end portion 86. The resin material 94 may also be provided on the object (the resin frame member 46) that is sealed by the passage beads 74. Further, the resin material 94 need not necessarily be provided, and the protruding end portion 86 may be placed directly in abutment against the resin frame member 46.

Figure 5A:
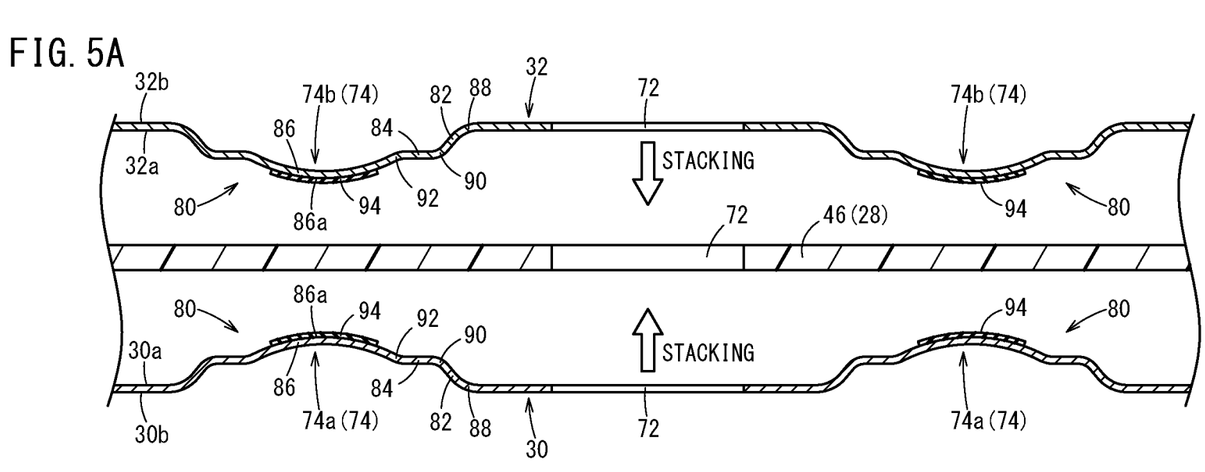
FIG. 5A is a partial cross-sectional view showing first and second separators and a resin frame member in the vicinity of a coolant drain passage prior to stacking thereof.
Figure 5B:
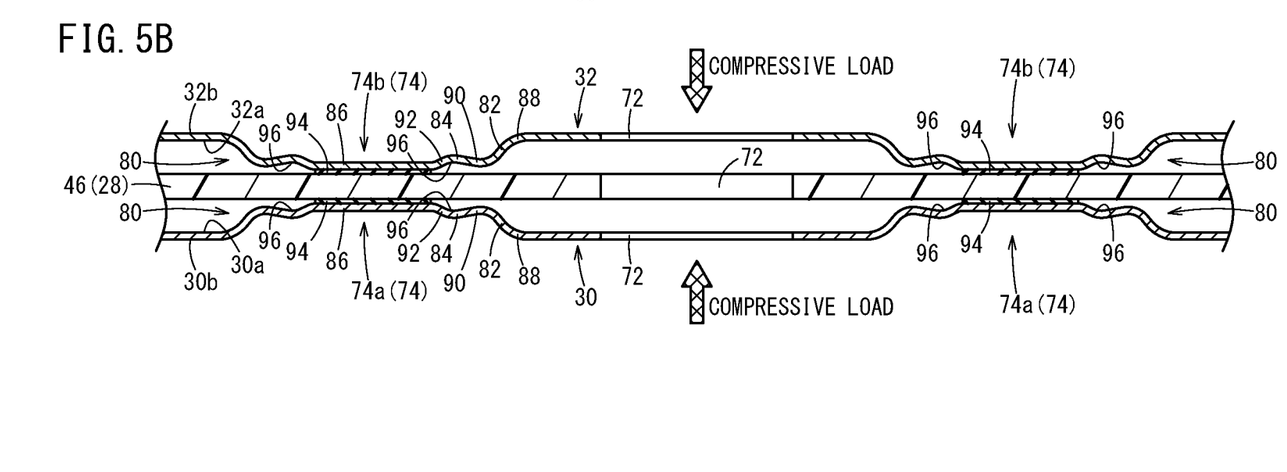
FIG. 5B is a partial cross-sectional view showing first and second separators and a resin frame member in the vicinity of a coolant drain passage in a stacked state.

As shown in FIG. 5A, each of the projections 80 (the passage beads 74) exhibits the above-described two-stage trapezoidal shape, in a state in which the first and second separators 30 and 32 are separated away from the resin frame member 46 (in the non-stacked state). In addition, as shown in FIG. 5B, at a time that the power generation cells 12 are manufactured, the first and second separators 30 and 32 assume a state of being stacked on the resin frame equipped MEA 28.

The projections 80, which are positioned on an outer peripheral part of the first and second separators 30 and 32, are placed in contact with the resin frame member 46 in such a stacked state, and thereby form a seal that prevents fluid from leaking. Further, in the stacked state, the compressive load is applied to the projections 80 in the stacking direction of the first and second separators 30 and 32, whereby the projections 80 undergo deformation from the non-stacked state. More specifically, in the projections 80 that are formed in the two-stage trapezoidal shape, the protruding end portions 86 thereof, which protrude foremost from the plate surface and directly contact opposing surfaces of the resin frame member 46, receive the compressive load. Consequently, the protruding end portions 86 are pressed and deformed from their arcuate shape into a flattened shape, and both ends of the projecting end portions 86 spread out in a widthwise direction.

As a result, the projecting-end-side connecting portions 92 of the pairs of stepped portions 84 that are contiguous with the protruding end portions 86 undergo elastic deformation upon receiving the compressive load from the protruding end portions 86. More specifically, due to the compressive load, in the pairs of stepped portions 84, the height of the projecting-end-side connecting portions 92 that are contiguous with the protruding end portions 86 is lowered (moved toward the plate surface), whereas the height of the root-side connecting portions 90 that are contiguous with the pair of root-side inclined portions 82 is maintained. Therefore, the pair of stepped portions 84 and the protruding end portions 86 undergo deformation so as to form depressions 96. In particular, the passage beads 74 surrounding the coolant drain passage 72 are formed in a circular shape with a small diameter (refer also to FIG. 3), and the restraining force of the root-side inclined portions 82 is increased (it is difficult for the root-side inclined portions 82 to be deformed). Thus, concerning the projections 80, by positively promoting deformation of the stepped portions 84, the protruding end portions 86 thereof are easily deformed into a flat shape, and the protruding end portions 86 can suitably be placed in surface contact with the resin frame member 46.

The fuel cell separators and the fuel cell stack 10 according to the present embodiment are basically configured in the manner described above. Next, operations of the fuel cell separators and the fuel cell stack 10 will be described.

As shown in FIG. 1, in the fuel cell stack 10, the oxygen-containing gas is supplied to the oxygen-containing gas supply passage 34a of the end plate 20a, the fuel gas is supplied to the fuel gas supply passage 38a of the end plate 20a, and the coolant is supplied to the coolant supply passage 36a of the end plate 20a.

As shown in FIG. 2, the oxygen-containing gas is introduced from the oxygen-containing gas supply passage 34a and via the bridge sections 53 (see FIG. 3) into the oxygen-containing gas flow field 48 of the first separator 30. In addition, the oxygen-containing gas moves along the oxygen-containing gas flow field 48 in the direction of the arrow B, and is supplied to the cathode 44 of the MEA 28a.

On the other hand, the fuel gas is introduced from the fuel gas supply passage 38a and via the bridge sections 63 into the fuel gas flow field 58 of the second separator 32. In addition, the fuel gas moves in the direction of the arrow B along the fuel gas flow field 58, and is supplied to the anode 42 of the MEA 28a.

Accordingly, in each of the MEAs 28a, the oxygen-containing gas supplied to the cathode 44 and the fuel gas supplied to the anode 42 are consumed in electrochemical reactions, and thereby generate electricity.

The oxygen-containing gas, which is supplied to and consumed at the cathode 44, flows from the oxygen-containing gas flow field 48, through the bridge sections 53, and to the oxygen-containing gas discharge passage 34b, and the oxygen-containing gas is discharged in the direction of the arrow A along the oxygen-containing gas discharge passage 34b. In the same way, the fuel gas, which is supplied to and consumed at the anode 42, flows from the fuel gas flow field 58, through the bridge sections 63, and to the fuel gas discharge passage 38b, and the fuel gas is discharged in the direction of the arrow A along the fuel gas discharge passage 38b.

Further, the coolant that is supplied to the coolant supply passage 36a is introduced into the coolant flow field 66 that is formed between the first separator 30 and the second separator 32, and thereafter, the coolant flows in the direction of the arrow B. After having cooled the MEAs 28a, the coolant is discharged from the coolant discharge passage 36b.

In this instance, as shown in FIGS. 2 and 3, the coolant flow field 66 is in communication with the air vent passage 70 via the internal space of the inner beads 51a and 61a, the internal space of the connecting beads 78a and 78b, the internal space of the passage beads 74a and 74b, and the internal space of the tunnels 79a and 79b. Due to communicating in this manner, the air contained within the coolant appropriately flows into the air vent passage 70, and the air is made to flow along the stacking direction of the stack body 14. Further, the coolant flow field 66 is in communication with the coolant drain passage 72 via the internal space of the inner beads 51a and 61a, the internal space of the connecting beads 78a and 78b, the internal space of the passage beads 74a and 74b, and the internal space of the tunnels 79a and 79b. Due to communicating in this manner, the coolant appropriately flows into the coolant drain passage 72, and the coolant is made to flow along the stacking direction of the stack body 14.

Further, as shown in FIG. 3 and FIGS. 5A and 5B, around the peripheries of the air vent passage 70 and the coolant drain passage 72, seals are formed respectively by the passage beads 74a and 74b of the first and second separators 30 and 32. As viewed in cross section, the protruding end portion 86 of the projection 80 is deformed from an arcuate shape into a flat shape accompanying application of the compressive load of the stack body 14. Consequently, a localized decrease or increase of the seal surface pressure can be eliminated, and at the protruding end portion 86, it is possible to make the surface pressure distribution in the widthwise direction of the seal uniform, as well as to improve the sealing performance.

Figure 4B:
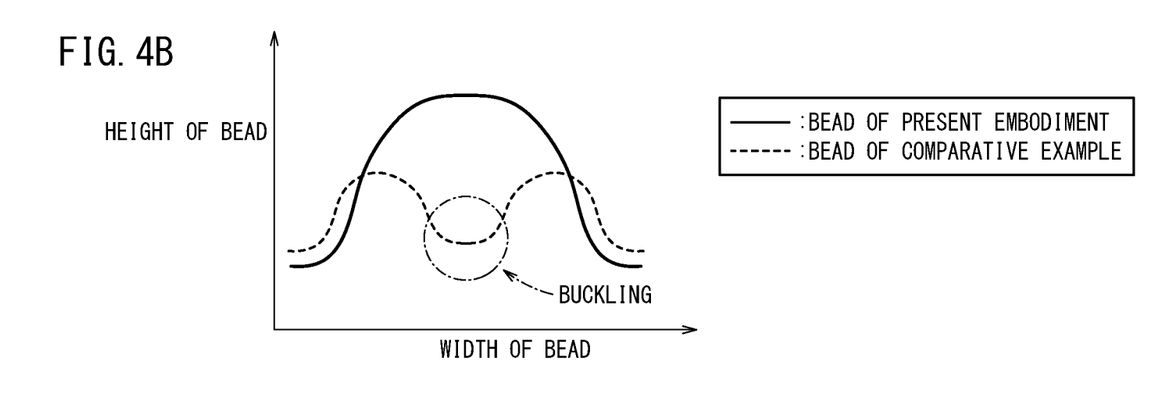
FIG. 4B is a graph showing changes in shape in a stacked state of a multistage bead according to the present embodiment, and changes in shape in a stacked state of a one-stage bead according to a comparative example.

In particular, the air vent passage 70 and the coolant drain passage 72 are formed in circular shapes such that the opening areas thereof are smaller in comparison with the flow passage cross-sectional areas of the respective passages for the fuel gas, the oxygen-containing gas, and the coolant, and also that the circumferential lengths thereof are shorter. Therefore, in comparison with the other beads (the inner beads 51a and 61a, etc.) that are formed in a one-stage trapezoidal shape, the restraining force of the root portion (root-side inclined portions 82) of the projections 80 is stronger. Concerning the change in shape of the protruding end portion in the case that the restraining force of the root portion is strong, a description thereof will be given with reference to FIG. 4B. In FIG. 4B, the passage bead of the comparative example is formed in a one-stage trapezoidal shape, and the change in shape in the case that a strong restraining force is applied thereto is shown. In this case, even if the compressive load is applied, the root portion does not undergo displacement due to the restraining force of the root portion, and consequently there is a possibility that the protruding end portion may undergo center-folding or buckling first (the central portion which is the sealed portion may become recessed), and a decrease in the sealing performance is likely to occur.

In contrast thereto, with the projections 80 (passage beads 74a and 74b) according to the present embodiment, even if the root portions are not displaced due to the restraining force, in applying the compressive load, deformation of the stepped portions 84 is positively promoted, and the protruding end portions 86 are easily deformed into a flat shape. Consequently, the protruding end portions 86 can suitably be brought into surface contact with the resin frame member 46 (refer also to FIG. 5B). As a result, the coolant flowing through the coolant drain passage 72 is reliably blocked from leaking to the exterior, by the seals of the passage beads 74a and 74b.

Figure 6A:
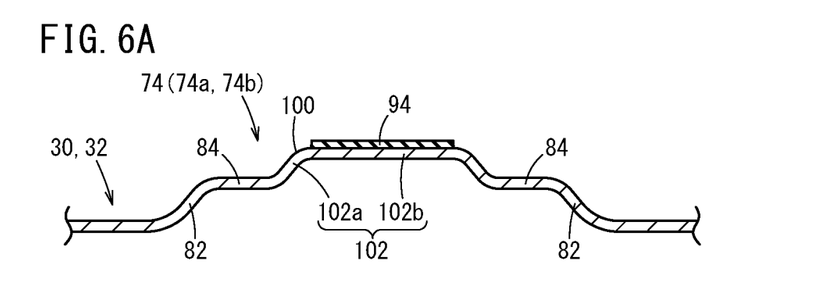
FIG. 6A is a cross-sectional view of a projection according to a first modification.

Moreover, the shape of the projection 80 is not limited to the shape of the above-described embodiment, and various configurations can be adopted therefor. For example, as in the first modification shown in FIG. 6A, the protruding end portion 102 of the projection 100 may include a pair of protruding-end-portion-side inclined portions 102a that project obliquely from each of the pair of stepped portions 84, and an end surface portion 102b that bridges across the pair of protruding-end-portion-side inclined portions 102a, and the end surface portion 102b may be formed in a flat shape. The resin material 94 is fixed to the surface of the end surface portion 102b. Even with such a configuration, in a state in which the compressive load is received, and by the stepped portions 84 undergoing deformation in the same manner as the above-described embodiment, the projection 100 is capable of suitably maintaining the sealed state of the end surface portion 102b.

Figure 6B:
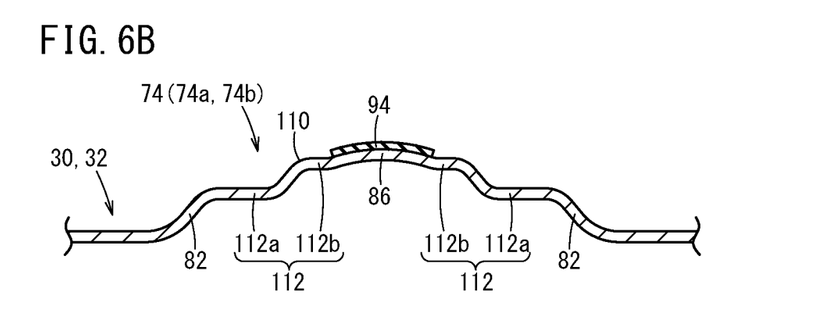
FIG. 6B is a cross-sectional view of a projection according to a second modification.

Further, for example, as in the second modification shown in FIG. 6B, the projection 110 may include two stepped portions 112 (a lower stepped portion 112a and an upper stepped portion 112b), and the projection 110 may have a trapezoidal shape which is equipped with the protruding end portion 86 that protrudes in a hemispherical shape on the upper stepped portion 112b. Stated otherwise, as long as the projections 80, 100, and 110 are formed in a trapezoidal shape having two or more stages, the same effects as those of the above-described embodiment can be obtained.

Figure 6C:
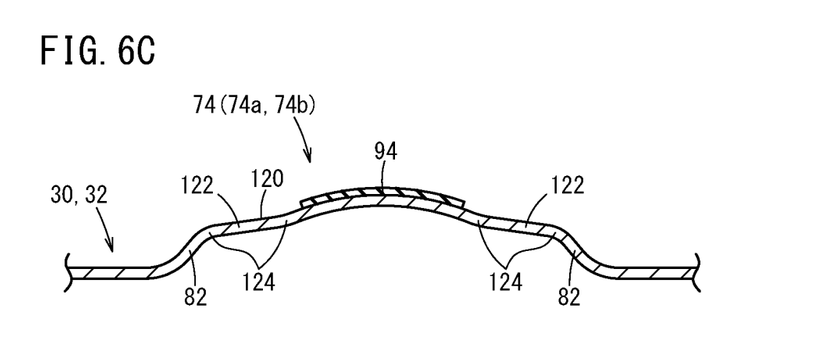
FIG. 6C is a cross-sectional view of a projection according to a third modification.

Furthermore, for example, as in the third modification shown in FIG. 6C, a configuration may be provided in which the pair of stepped portions 122 of the projection 120 are inclined obliquely upward from one ends (the root-side connecting portions 90) toward the other ends (the protruding-end-side connecting portions 92). More specifically, the projection 120 may include only appropriate curved portions 124 (the root-side connecting portions 90 and the protruding-end-side connecting portions 92) in a manner so that the depressions 96 (see FIG. 5B) are generated at the stepped portions 122. In this case as well, by the stepped portions 122 being deformed, it is possible to suppress deformation (buckling) of the central portion in the widthwise direction, and the same effects as those of the above-described embodiment can be obtained.

The fuel cell separators (the first and second separators 30 and 32) and the fuel cell stack 10 according to the present embodiment exhibit the following advantageous effects.

By means of a simple structure in which, in the fuel cell separators (the first and second separators 30 and 32), the beads (the passage beads 74) are formed integrally with the first and second separators 30 and 32, and when viewed in cross section, protrude from the plate surfaces together with being formed in a multistage trapezoidal shape, a seal can be formed in a suitable manner. More specifically, when the passage beads 74 receive a compressive load at the time of stacking the cells in production of the fuel cell, the stepped portions undergo deformation (bending) more positively than the portions thereof that are in contact with the objects (the resin frame members 46) to be sealed. Therefore, even in the case that a strong restraining force acts on the root portion which is in close proximity to the plate surfaces, the passage beads 74 can suppress buckling of the contacting portions to thereby achieve a suitable sealing performance. Consequently, the passage beads 74 can more reliably prevent leakage of fluid from the sealed portions with the objects, and the fluid can be made to flow in a stable manner.

Further, the beads (the passage beads 74) are formed in a two-stage trapezoidal shape when viewed in cross section. The passage beads 74 which are formed in this manner with a two-stage trapezoidal shape can be easily manufactured by press forming, and manufacturing costs can be reduced.

Furthermore, when viewed in cross section, each of the beads (the passage beads 74) includes the pair of root-side inclined portions 82 contiguous with the plate surface and which project from the plate surface, the pair of stepped portions 84 connected respectively to the protruding end portions (the root-side connecting portions 90) of the pair of root-side inclined portions 82, and which extend to an inner side of the pair of root-side inclined portions 82, and the protruding end portion 86 contiguous with the inner end portions (the protruding-end-side connecting portions 92) of the pair of stepped portions 84, and which is spaced further apart from the plate surface than the pair of stepped portions 84. In accordance with these features, in applying the compressive load, the passage beads 74 positively promote deformation of the stepped portions 84, the protruding end portions 86 thereof are easily pressed and deformed into a flat shape, and the protruding end portions 86 can suitably be placed in surface contact with the resin frame member 46.

Further, when viewed in cross section, the protruding end portion 86 exhibits an arcuate shape in a state of not being stacked on an object (the resin frame member 46) on which sealing is performed, and is deformed into a flat shape in a state in which the resin frame member 46 is stacked thereon and a compressive load is received from the resin frame member 46. In accordance with this feature, when the compressive load is received, the protruding end portion 86 spreads out evenly in a widthwise direction and is deformed into a flat shape, and the surface pressure of the sealed portion can be made more uniform.

Still further, the pair of stepped portions 84 extend in parallel with a planar direction of the plate surface. In accordance with this feature, when they receive the compressive load, the pair of stepped portions 84 are capable of undergoing movement smoothly to the side of the plate surface.

In this instance, each of the fuel cell separators (the first and second separators 30 and 32) includes a drain hole (the coolant drain passage 72) which is formed to penetrate in a thickness direction and enables the coolant to flow therethrough, and an air vent hole (the air vent passage 70) that enables air to flow therethrough, and the beads (the passage beads 74) are preferably formed around the periphery of the coolant drain passage 72 or the air vent passage 70. The air vent passage 70 and the coolant drain passage 72 are formed with a small opening area, and the passage beads 74 therearound are also formed to be small accordingly. Consequently, it is difficult for the root-side portions thereof to be deformed. In this case as well, due to the above-described action of the multistage trapezoidal shapes thereof, the passage beads 74 are capable of suitably maintaining a sealing performance even upon receiving the compressive load. As a result, leakage of fluid from the air vent passage 70 or the coolant drain passage 72 can be reliably blocked or interrupted.

Further still, the beads (passage beads 74) are formed in a circular annular shape as viewed from a thickness direction of the fuel cell separator. In this case as well, although it is more difficult for the root-side portions of the passage beads 74 to be deformed, due to the above-described action of the multistage trapezoidal shapes thereof, it is possible to suitably maintain a sealing performance even upon receiving the compressive load.

Further, the fuel cell stack 10 is equipped with the above-described fuel cell separators (the first and second separators 30 and 32), and the membrane electrode assemblies 28*a*, and can be configured in a manner so that a plurality of the joint separators 33 each constituted from the first and second separators 30 and 32, and a plurality of the MEAs 28*a* are alternately stacked on one another. By the fuel cell stack 10 having the above-described beads (the passage beads 74), seals can be suitably formed therein in the stacked state, and leakage of fluid can be reliably blocked or interrupted.

The present invention is not limited to the embodiments described above, and various modifications may be made thereto in accordance with the essence and gist of the present invention. For example, the beads (the projections 80, 100, 110, and 120) are not limited to ones that are disposed around the periphery of the air vent passage 70 and the coolant drain passage 72, and the beads may be applied to other portions such as the first and second seal lines 51 and 61. Stated otherwise, the multistage trapezoidal projections 80, 100, 110, and 120 may be applied to the inner beads 51*a* and 61*a*, the outer beads 51*b* and 61*b*, and the passage beads 52 and 62, etc.

Further, for example, the planar shapes of the air vent passage 70 and the coolant drain passage 72 are not limited to being of a circular shape, and various shapes such as a rectangular shape, a square shape, a polygonal shape such as a hexagon or the like, or an elliptical shape can be adopted therefor. Moreover, in the case of polygonal shaped passages, such passages preferably have rounded shapes at the corners thereof. In addition, also concerning the planar shapes of the beads (the projections 80, 100, 110, and 120) that surround the air vent passage 70 and the coolant drain passage 72, various shapes may be adopted therefor corresponding to the planar shapes of the passages, such as a rectangular shape, a square shape, a polygonal shape such as a hexagon or the like, or an elliptical shape.

What is claimed is:

1. A fuel cell separator formed in a plate shape and comprising a bead configured to form a seal that prevents leakage of fluid;
    wherein the bead is formed integrally with the fuel cell separator, and when viewed in cross section, protrudes from the plate surface of the fuel cell separator together with being formed in a multistage trapezoidal shape, and wherein when viewed in cross section, the bead includes:
    a pair of root-side inclined portions contiguous with the plate surface and which project from the plate surface; and
    a pair of stepped portions connected respectively to protruding end portions of the pair of root-side inclined portions, and which extend to an inner side of the pair of root-side inclined portions.

2. The fuel cell separator according to claim 1, wherein the bead is formed in a two-stage trapezoidal shape when viewed in cross section.

3. The fuel cell separator according to claim 1, wherein when viewed in cross section, the bead further includes:
    a protruding end portion contiguous with inner end portions of the pair of stepped portions, and which is spaced further apart from the plate surface than the pair of stepped portions.

4. The fuel cell separator according to claim 3, wherein when viewed in cross section, the protruding end portion exhibits an arcuate shape in a state of not being stacked on an object to be sealed, and is deformed into a flat shape in a state in which the object is stacked thereon and a compressive load is received from the object.

5. The fuel cell separator according to claim 3, wherein the pair of stepped portions extend in parallel with a planar direction of the plate surface.

6. The fuel cell separator according to claim 1, wherein:
    the fuel cell separator includes a drain hole formed to penetrate in a thickness direction and configured to enable a coolant to flow therethrough, and an air vent hole configured to enable air to flow therethrough; and
    the bead is formed around a periphery of the drain hole or the air vent hole.

7. The fuel cell separator according to claim 1, wherein the bead is formed in a circular annular shape as viewed from a thickness direction of the fuel cell separator.

8. A fuel cell stack comprising:
    a plurality of fuel cell separators; and
    a plurality of membrane electrode assemblies;
    wherein each of the fuel cell separators is formed in a plate shape and includes a bead configured to form a seal that prevents leakage of fluid;
    wherein the bead is formed integrally with each of the fuel cell separators, and when viewed in cross section, protrudes from a plate surface of each of the fuel cell separators together with being formed in a multistage trapezoidal shape; and
    wherein joint separators and the membrane electrode assemblies are alternately stacked on one another, each of the joint separators comprising the fuel cell separators, and wherein when viewed in cross section, the bead includes:
    a pair of root-side inclined portions contiguous with the plate surface and which project from the plate surface; and
    a pair of stepped portions connected respectively to protruding end portions of the pair of root-side inclined portions, and which extend to an inner side of the pair of root-side inclined portions.

* * * * *